United States Patent
Kim

(10) Patent No.: US 9,215,777 B2
(45) Date of Patent: Dec. 15, 2015

(54) PIXEL AND ORGANIC LIGHT EMITTING DISPLAY DEVICE USING THE SAME

(71) Applicant: Samsung Display Co., Ltd., Yongin-si, Gyeonggi-Gu (KR)

(72) Inventor: Dong-Hwi Kim, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 168 days.

(21) Appl. No.: 13/907,198

(22) Filed: May 31, 2013

(65) Prior Publication Data

US 2014/0168180 A1 Jun. 19, 2014

(30) Foreign Application Priority Data

Dec. 13, 2012 (KR) .................. 10-2012-0145454

(51) Int. Cl.
*G09G 3/32* (2006.01)
*H05B 33/08* (2006.01)

(52) U.S. Cl.
CPC .......... *H05B 33/0896* (2013.01); *G09G 3/3233* (2013.01); *G09G 2300/0842* (2013.01); *G09G 2300/0861* (2013.01); *G09G 2310/0262* (2013.01)

(58) Field of Classification Search
CPC ............. H05B 33/0896; G09G 3/3225; G09G 3/3233; G09G 2310/0262; G09G 2300/0861; G09G 2300/0842
See application file for complete search history.

(56) References Cited

U.S. PATENT DOCUMENTS

| | | | | |
|---|---|---|---|---|
| 7,760,164 B2* | 7/2010 | Shin | ................................ | 345/76 |
| 7,782,275 B2* | 8/2010 | Kim et al. | ........................ | 345/76 |
| 8,283,967 B2* | 10/2012 | Chaji et al. | ..................... | 327/390 |
| 8,890,220 B2* | 11/2014 | Nathan et al. | .................. | 257/292 |
| 2003/0132931 A1* | 7/2003 | Kimura et al. | ................. | 345/212 |
| 2004/0145547 A1* | 7/2004 | Oh | .................................. | 345/76 |
| 2004/0196239 A1* | 10/2004 | Kwon | .............................. | 345/92 |
| 2006/0119552 A1* | 6/2006 | Yumoto | .......................... | 345/76 |
| 2006/0139253 A1* | 6/2006 | Choi et al. | ....................... | 345/76 |
| 2006/0176250 A1* | 8/2006 | Nathan et al. | .................... | 345/76 |
| 2006/0187153 A1* | 8/2006 | Nathan et al. | .................... | 345/76 |
| 2007/0063932 A1* | 3/2007 | Nathan et al. | .................... | 345/76 |
| 2008/0036704 A1 | 2/2008 | Kim et al. | | |
| 2011/0115772 A1 | 5/2011 | Chung | | |
| 2011/0193856 A1 | 8/2011 | Han | | |

(Continued)

FOREIGN PATENT DOCUMENTS

| KR | 10-0739335 B1 | 7/2007 |
|---|---|---|
| KR | 10-2011-0053708 A | 5/2011 |
| KR | 10-2011-0092820 A | 8/2011 |

*Primary Examiner* — Christopher E Leiby
(74) *Attorney, Agent, or Firm* — Robert E. Bushnell, Esq.

(57) ABSTRACT

A structure of a pixel and an organic light emitting display device using the same are provided. The pixel includes an organic light emitting diode; a first transistor controlling the amount of current supplied from a first power source to the organic light emitting diode depending on a voltage applied to a second node; a second transistor coupled between a data line and a first node, and turned on when a scan signal is supplied to a first scan line; a third transistor coupled between the first power source and the first node, and turned on when the scan signal is supplied to a second scan line; a fourth transistor coupled between the first power source and the second node, and turned on when the scan signal is supplied to the second scan line; and a storage capacitor coupled between the first and second nodes.

11 Claims, 2 Drawing Sheets

(56) References Cited

U.S. PATENT DOCUMENTS

| | | | |
|---|---|---|---|
| 2012/0075361 A1* | 3/2012 | Kishi | 345/690 |
| 2012/0098877 A1* | 4/2012 | Taro et al. | 345/691 |
| 2012/0120046 A1* | 5/2012 | Senda | 345/211 |
| 2013/0099692 A1* | 4/2013 | Chaji et al. | 315/224 |

* cited by examiner

PIXEL AND ORGANIC LIGHT EMITTING DISPLAY DEVICE USING THE SAME

CLAIM OF PRIORITY

This application claims priority to and the benefit of Korean Patent Application No. 10-2012-0145454, filed on Dec. 13, 2012, in the Korean Intellectual Property Office, the entire content of which is incorporated herein by reference.

BACKGROUND

1. Field of the Invention

An aspect of the present invention relates to a pixel and an organic light emitting display device using the same, and more particularly, to a pixel and an organic light emitting display device using the same, which can improve image quality.

2. Description of the Related Art

Recently, various types of flat panel display devices capable of reducing the weight and volume of cathode ray tubes have been developed. The flat panel display devices include a liquid crystal display, a field emission display, a plasma display panel, an organic light emitting display device, and the like.

Among these flat panel display devices, the organic light emitting display device displays images using organic light emitting diodes that emit light through recombination of electrons and holes. The organic light emitting display device has a fast response speed and is driven with low power consumption.

An organic light emitting display device has a plurality of pixels arranged in a matrix form at intersection portions of a plurality of data lines, a plurality of scan lines and a plurality of power lines. Each of the pixels generally includes an organic light emitting diode, two or more transistors including a driving transistor, and one or more capacitors.

The organic light emitting display device has low power consumption. However, in the organic light emitting display device, the amount of current that flows in an organic light emitting diode is changed depending on the variation in the threshold voltage of the driving transistor included in each pixel, and therefore, images with unequal luminance are displayed. That is, characteristics of the driving transistor are changed depending on the fabrication factor of the driving transistor included in each pixel. Practically, it is impossible in the current fabrication process to fabricate the organic light emitting display device so that all transistors of the organic light emitting display device have the same characteristics. Accordingly, the variation in the threshold voltage of the driving transistor occurs.

To solve such a problem, a method of adding a compensation circuit including a plurality of transistors and capacitors to each pixel has been proposed. The compensation circuit compensates for a variation in threshold voltage of a driving transistor by allowing the driving transistor to be diode-coupled during a period of supplying a scan signal. Here, a gate electrode of the diode-coupled driving transistor is initialized to a negative initialization power source and then receives a data signal supplied.

However, in a case where the gate electrode of the driving transistor is initialized using the initialization power source in the conventional method, an image with a desired luminance is not displayed by leakage current. In other words, a leakage path is formed from the gate electrode of the driving transistor to the initialization power source, and an image with a desired luminance is not displayed by leakage current through the leakage path.

Conventionally, a structure in which two capacitors is included in a compensation circuit was proposed. However, in a case where the two capacitors are included in the compensation circuit, an undesired image, e.g., a blurred image is displayed by a change in capacitance between the capacitors due to process tolerance. In other words, in a case where the two capacitors are included in the compensation circuit, a predetermined ratio should be maintained between the capacitances of the two capacitors. If the capacitance of one of the two capacitors is increased, the predetermined ratio is not maintained, and accordingly, image quality is deteriorated.

SUMMARY OF THE INVENTION

Embodiments provide a pixel and an organic light emitting display device using the same, which can improve image quality.

According to an aspect of the present invention, there is provided a pixel including: an organic light emitting diode; a first transistor controlling the amount of current supplied from a first power source to the organic light emitting diode depending on a voltage applied to a second node; a second transistor coupled between a data line and a first node, and turned on when a scan signal is supplied to a first scan line; a third transistor coupled between the first power source and the first node, and turned on when the scan signal is supplied to a second scan line; a fourth transistor coupled between the first power source and the second node, and turned on when the scan signal is supplied to the second scan line; and a storage capacitor coupled between the first and second nodes.

The pixel may further include a fifth transistor coupled between the first node and a reference power source, and turned off during a period in which the second and third transistors are turned on and turned off during the other period. The pixel may further include a sixth transistor coupled between the second node and a second electrode of the first transistor, and turned on when the scan signal is supplied to the first scan line; and a seventh transistor coupled between the second electrode of the first transistor and the organic light emitting diode, and simultaneously turned on/off with the fifth transistor.

According to an aspect of the present invention, there is provided an organic light emitting display device, including: a scan driver supplying a scan signal to scan lines, and supply an emission control signal to emission control lines; a data driver supplying a data signal to data lines; and pixels positioned at intersection portions of the scan lines and the data lines, wherein each of pixels positioned on an i-th (i is a natural number) horizontal line includes: an organic light emitting diode; a first transistor controlling the amount of current supplied from a first power source to the organic light emitting diode depending on a voltage applied to a second node; a second transistor coupled between a data line and a first node, and turned on when a scan signal is supplied to a first scan line; a third transistor coupled between the first power source and the first node, and turned on when the scan signal is supplied to a second scan line; a fourth transistor coupled between the first power source and the second node, and turned on when the scan signal is supplied to the second scan line; and a storage capacitor coupled between the first and second nodes.

The first scan line may be set as an i-th scan line, and the second scan line may be set as an (i−1)-th scan line. The data signal may be set to a voltage lower than that of the first power source. Each pixel may further include a fifth transistor coupled between the first node and a reference power source, and turned off when an emission control signal is supplied to a first emission control line and otherwise turned on. The voltage of the reference power source may be set to a specific voltage within a voltage range of the data signal. The first emission control line may be set as an i-th emission control line. The scan driver may supply the emission control signal to the first emission control line so that the emission control signal overlaps with the scan signal supplied to the first and second scan lines. Each pixel may further include a sixth transistor coupled between the second node and a second electrode of the first transistor, and turned on when the scan signal is supplied to the first scan line; and a seventh transistor coupled between the second electrode of the first transistor and the organic light emitting diode, and turned off when the emission control signal is supplied to the first emission control line and otherwise turned on.

In the pixel and the organic light emitting display device according to the present invention, the gate electrode of the driving transistor is not coupled to a separate initialization power source, and accordingly, it is possible to the amount of leakage current. Further, the pixel of the present invention includes one capacitor, and thus it is possible to prevent deterioration of image quality due to a change in capacitance of the capacitor.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
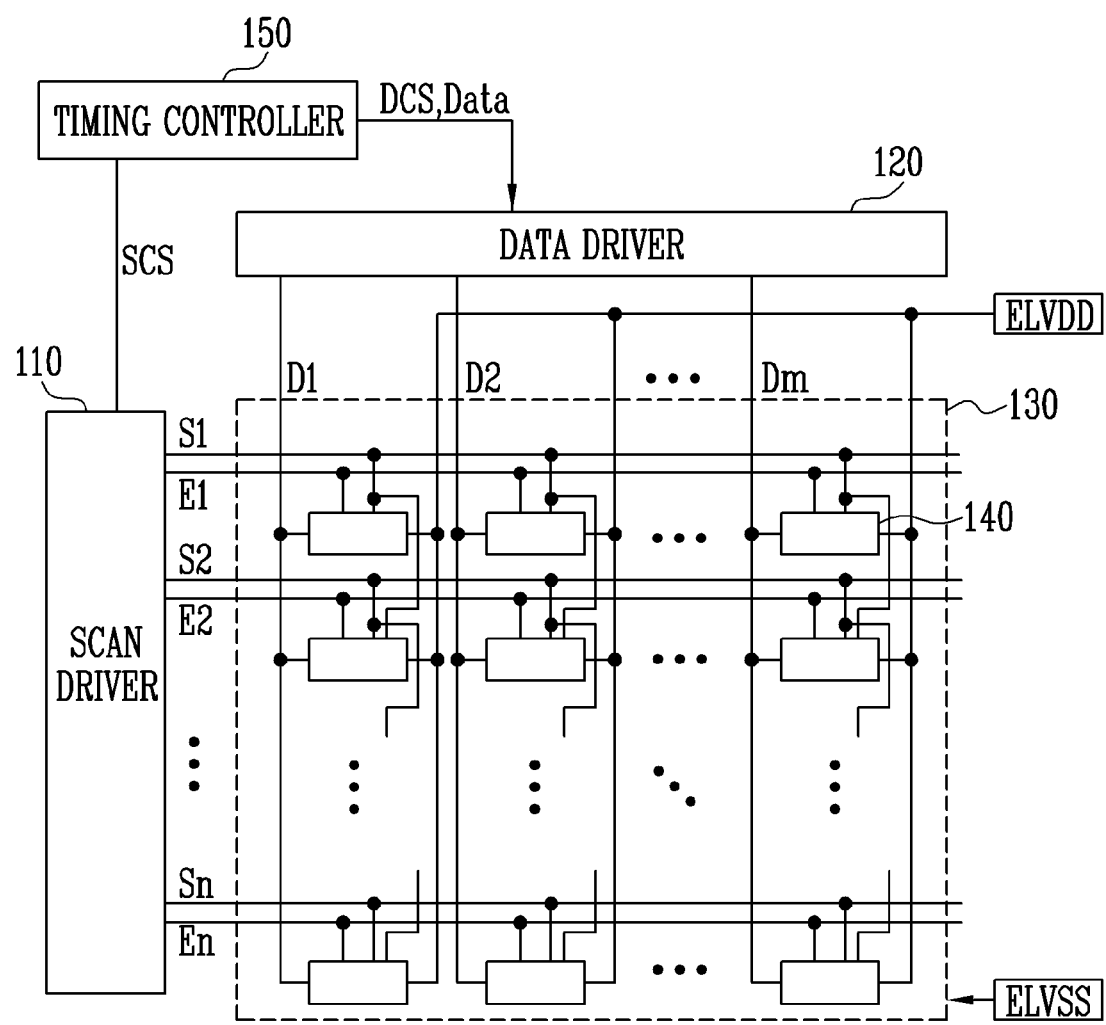
FIG. 1 is a block diagram illustrating an organic light emitting display device according to an embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a block diagram illustrating an organic light emitting display device according to an embodiment of the present invention.

Referring to FIG. 1, the organic light emitting display device according to this embodiment includes a pixel unit 130 having pixels 140 positioned at intersection portions of scan lines S1 to Sn and data lines D1 to Dm, a scan driver 110 driving the scan lines S1 to Sn and emission control lines E1 to En, a data driver 120 driving the data lines D1 to Dm, and a timing controller 150 controlling the scan driver 110 and the data driver 120.

The timing controller 150 generates a data driving control signal DCS and a scan driving control signal SCS, corresponding to synchronization signals supplied from the outside thereof. The data driving control signal DCS generated in the timing controller 150 is supplied to the data driver 120, and the scan driving control signal SCS generated in the timing controller 150 is supplied to the scan driver 110. The timing controller 150 supplies, to the data driver 120, data Data supplied from the outside thereof.

The scan driver 110 receives the scan driving control signal SCS supplied from the timing controller 150. The scan driver 110 receiving the scan driving control signal SCS supplied from the timing controller 150 generates a scan signal, and supplies the generated scan signal to the scan lines S1 to Sn. The scan driver 110 generates an emission control signal, in response to the scan driving control signal SCS, and supplies the generated emission control signal to the emission control lines E1 to En. Here, the emission control signal is set to a voltage (e.g., a high voltage) at which a transistor is turned off, and the scan signal is set to a voltage (e.g., a low voltage) at which the transistor is turned on. The emission control signal is set to have a width identical to or wider than that of the scan signal. For example, the emission control signal supplied to an i-th (i is a natural number) emission control line Ei may be supplied to overlap with the scan signal supplied to (i−1)-th and i-th scan lines Si−1 and Si.

The data driver 120 receives the data driving control signal DCS supplied from the timing controller 150. The data driver 120 receiving the data driving control signal DCS supplied from the timing controller 150 generates a data signal, and supplies the generated data signal to the data lines D1 to Dm, in synchronization with the scan signal.

The pixel unit 130 receives a first power source ELVDD and a second power source ELVSS, supplied from the outside thereof, and supplies the received first and second power sources ELVDD and ELVSS to the pixels 140. Each pixel 140 receiving the first and second power sources ELVDD and ELVSS generates light, corresponding to the data signal. Here, pixels 140 positioned on an i-th horizontal line each initializes a gate electrode of a driving transistor during a period in which the scan signal is supplied to the (i−1)-th scan line Si−1, and charges a voltage corresponding to the threshold voltage of the driving transistor, the voltage of the data signal and the voltage drop of the first power source ELVDD during a period in which the scan signal is supplied to the i-th scan line Si. Each of the pixels positioned on the i-th horizontal line generates light with a predetermined luminance, corresponding to the charged voltage, after the supply of the emission control signal to the i-th emission control line Ei is stopped.

Figure 2:
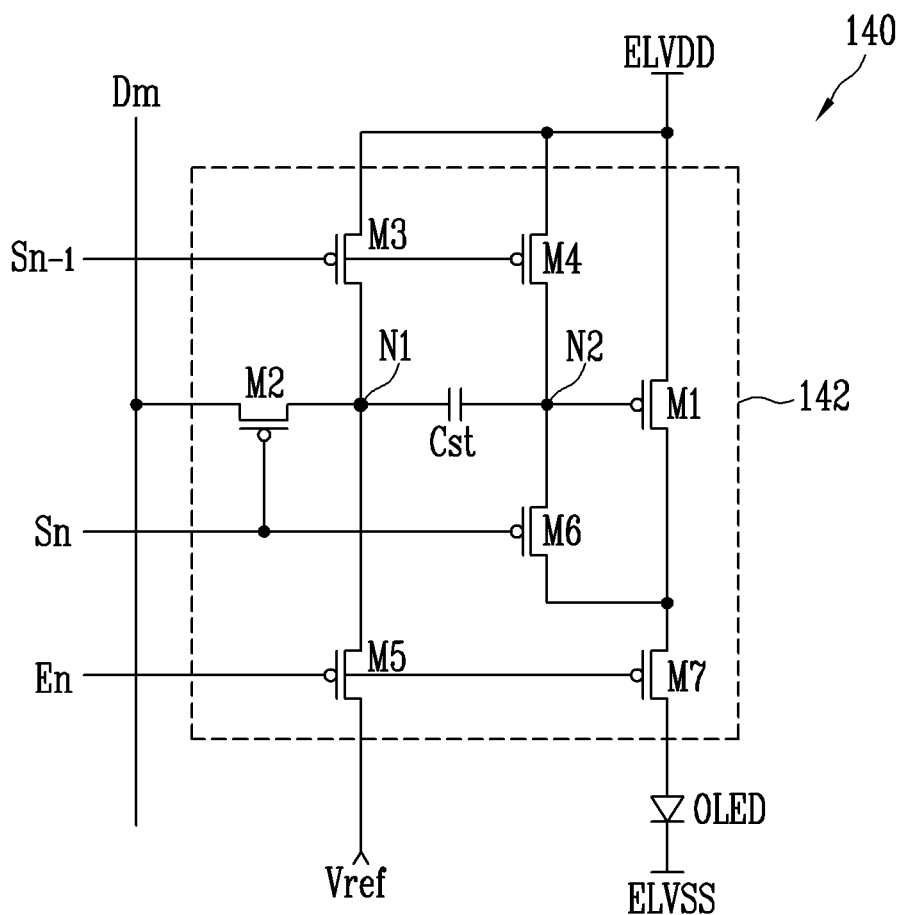
FIG. 2 is a circuit diagram illustrating a pixel according to an embodiment of the present invention.

FIG. 2 is a circuit diagram illustrating a pixel according to an embodiment of the present invention.

Referring to FIG. 2, the pixel 140 according to this embodiment includes an organic light emitting diode OLED, and a pixel circuit 142 controlling the amount of current supplied to the organic light emitting diode OLED.

An anode electrode of the organic light emitting diode OLED is coupled to the pixel circuit 142, and a cathode electrode of the organic light emitting diode OLED is coupled to the second power source ELVSS. Here, the second power source ELVSS is set to a voltage lower than that of the first power source ELVDD. The organic light emitting diode OLED generates light with a predetermined luminance, corresponding to the amount of current supplied from the pixel circuit 142.

The pixel circuit 142 controls the amount of current supplied to the organic light emitting diode OLED, corresponding to a data signal. To this end, the pixel circuit 142 includes first to seventh transistors M1 to M7 and a storage capacitor Cst.

A first electrode of the first transistor M1 (driving transistor) is coupled to the first power source ELVDD, and a second electrode of the first transistor M1 is coupled to a first electrode of the seventh transistor M7. A gate electrode of the first transistor M1 is coupled to a second node N2. The first transistor M1 controls the amount of current supplied from the first power source ELVDD to the organic light emitting diode OLED, depending on the voltage applied to the second node N2.

A first electrode of the second transistor M2 is coupled to the data line Dm, and a second electrode of the second transistor M2 is coupled to a first node N1. A gate electrode of the second transistor M2 is coupled to the n-th scan line Sn. When a scan signal is supplied to the n-th scan line Sn, the second transistor M2 is turned on to electrically couple the data line Dm and the first node N1 to each other. Herein the n-th scan line Sn is referred to as a first or current scan line.

A first electrode of the third transistor M3 is coupled to the first power source ELVDD, and a second electrode of the third transistor M3 is coupled to the first node N1. A gate electrode of the third transistor M3 is coupled to an (n−1)-th scan line Sn−1. When the scan signal is supplied to the (n−1)-th scan line Sn−1, the third transistor M3 is turned on to supply the voltage of the first power source ELVDD to the first node N1. Herein the (n−1)-th scan line Sn−1 is referred to as a second or previous scan line A first electrode of the fourth transistor M4 is coupled to the first power source ELVDD, and a second electrode of the fourth transistor M4 is coupled to the second node N2. A gate electrode of the fourth transistor M4 is coupled to the (n−1)-th scan line Sn−1. When the scan signal is supplied to the (n−1)-th scan line Sn−1, the fourth transistor M4 is turned on to supply the voltage of the first power source ELVDD to the second node N2.

A first electrode of the fifth transistor M5 is coupled to the first node N1, and a second electrode of the fifth transistor M5 is coupled to a reference power source Vref. A gate electrode of the fifth transistor M5 is coupled to an emission control line En. When an emission control signal is supplied to the emission control line En, the fifth transistor M5 is turned off. When the emission control signal is not supplied to the emission control line En, the fifth transistor M5 is turned on. If the fifth transistor M5 is turned on, the voltage of the reference power source Vref is supplied to the first node N1. Here, the reference power source Vref is set to a specific voltage within a voltage range of the data signal.

A first electrode of the sixth transistor M6 is coupled to the second electrode of the first transistor M1, and a second electrode of the sixth transistor M6 is coupled to the second node N2. A gate electrode of the sixth transistor M6 is coupled to the n-th scan line Sn. When the scan signal is supplied to the n-th scan line Sn, the sixth transistor M6 is turned on to allow the first transistor M1 to be diode-coupled.

The first electrode of the seventh transistor M7 is coupled to the second electrode of the first transistor M1, and a second electrode of the seventh transistor M7 is coupled to the anode electrode of the organic light emitting diode OLED. A gate electrode of the seventh transistor M7 is coupled to the emission control line En. When the emission control signal is supplied to the emission control line En, the seventh transistor M7 is turned off. When the emission control signal is not supplied to the emission control line En, the seventh transistor M7 is turned on. If the seventh transistor M7 is turned on, the first transistor M1 and the organic light emitting diode OLED are electrically coupled to each other.

The storage capacitor Cst is positioned between the first and second nodes N1 and N2. The storage capacitor Cst charges a voltage corresponding to the voltage of the data signal, the threshold voltage of the first transistor M1 and the voltage drop of the first power source ELVDD.

Figure 3:
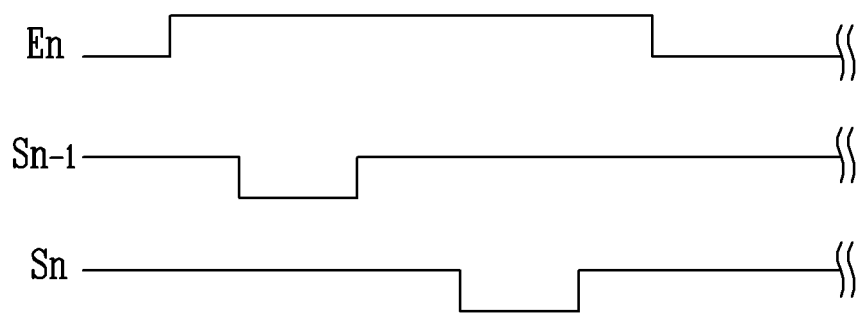
FIG. 3 is a waveform diagram illustrating an embodiment of driving waveforms supplied to the pixel shown in FIG. 2.

FIG. 3 is a waveform diagram illustrating an embodiment of driving waveforms supplied to the pixel shown in FIG. 2. For convenience of illustration, a pixel coupled to an n-th scan line Sn and an m-th data line Dm is shown in FIG. 2.

Referring to FIG. 3, an emission control signal is first supplied to the emission control line En so that the fifth and seventh transistors M5 and M7 are turned off. If the fifth transistor M5 is turned off, the first node N1 and the reference power source Vref are electrically disconnected from each other. If the seventh transistor M7 is turned off, the first transistor M1 and the organic light emitting diode OLED are electrically disconnected from each other. If the first transistor M1 and the organic light emitting diode OLED are electrically disconnected from each other, the organic light emitting diode OLED is set to be in a non-emission state.

Subsequently, a scan signal is supplied to the (n−1)-th scan line Sn−1 so that the third and fourth transistors M3 and M4 are turned on. If the third transistor M3 is turned on, the voltage of the first power source ELVDD is supplied to the first node N1. If the fourth transistor M4 is turned on, the voltage of the first power source ELVDD is supplied to the second node N2. If the voltage of the first power source ELVDD is supplied to the first and second nodes N1 and N2, the storage capacitor Cst is initialized.

After the voltage of the first power source ELVDD is supplied to the first and second nodes N1 and N2, a scan signal is supplied to the n-th scan line Sn. If the scan signal is supplied to the n-th scan line Sn, the second and sixth transistors M2 and M6 are turned on.

If the sixth transistor M6 is turned on, the gate electrode and the second electrode of the first transistor M1 are electrically coupled to each other. That is, if the sixth transistor M6 is turned, the first transistor M1 is diode-coupled. If the second transistor M2 is turned on, the data line Dm and the first node N1 are electrically coupled to each other. Then, a data signal from the data line Dm is supplied to the first node N1. In this case, the voltage at the first node N1 is dropped from the voltage of the first power source ELVDD to the voltage of the data signal. To this end, the data signal is set to a voltage lower than that of the first power source ELVDD.

If the voltage at the first node N1 is dropped, the voltage at the second node N2 is also dropped by the coupling of the storage capacitor Cst. If the voltage at the second node N2 is dropped, the diode-coupled first transistor M1 is turned on. In this case, the voltage at the second node N2 is increased to a voltage obtained by subtracting the threshold voltage of the first transistor M1 from the voltage of the first power source ELVDD.

That is, during the period in which the scan signal is supplied to the n-th scan line Sn, the first node N1 is set to the voltage of the data signal, and the second node N2 is set to the voltage obtained by subtracting the threshold voltage of the first transistor M1 from the voltage of the first power source ELVDD. Then, the storage capacitor Cst charges a voltage corresponding to the voltage difference between the first and second nodes N1 and N2.

Meanwhile, the voltage applied to the second node N2 is a voltage to the voltage drop of the first power source ELVDD is reflected. In other words, the voltage applied to the second node N2 may be differently set in each pixel 140, corresponding to the voltage drop of the first power source ELVDD. Thus, during the period in which the scan signal is supplied to the n-th scan line Sn, a voltage corresponding to the voltage drop of the first power source ELVDD and the threshold voltage of the first transistor M1 is applied to the second node N2. In this case, during the period in which the scan signal is supplied to the n-th scan line Sn, a voltage corresponding to the voltage drop of the first power source ELVDD, the threshold voltage of the first transistor M1 and the voltage of the data signal is charged in the storage capacitor Cst.

After a predetermined voltage is charged in the storage capacitor Cst, the supply of the emission control signal to the emission control line En is stopped. If the supply of the emission control signal to the emission control line En is stopped, the fifth and seventh transistors M5 and M7 are turned on.

If the fifth transistor M5 is turned on, the voltage of the reference power source Vref is supplied to the first node N1. Then, the voltage at the first node N1 is changed from the voltage of the data signal to the voltage of the reference power source Vref. Here, the voltage of the reference power source Vref is set to a specific voltage within a voltage range of the data signal.

For example, in a case where a black data signal is supplied to the first node N1, the voltage of the reference power source Vref is set so that the voltage at the first node N1 is raised. If the voltage at the first node N1 is raised, the voltage at the second node N2 is also increased, and accordingly, the first transistor M1 is stably turned off.

In a case where a white data signal is supplied to the first node N1, the voltage of the reference power source Vref is set so that the voltage at the first node N1 is dropped. If the voltage at the first node N1 is dropped, the voltage at the second node N2 is also dropped. Accordingly, the first transistor M1 is turned on so that current corresponding to white is supplied to the organic light emitting diode OLED. Here, the range of voltage drop at the first node N1 is determined by the data signal, and accordingly, luminance of various gray scales can be implemented, corresponding to the data signal.

Practically, the pixel of the present invention an image with a predetermined gray scale is implemented by repeating the procedure described above. Meanwhile, in the present invention, the second node N2 is not coupled to a separate initialization power source, and accordingly, it is possible to minimize leakage current from the second node N2. Further, the pixel of the present invention can compensate for the threshold voltage of the first transistor M1 and the voltage drop of the first power source ELVDD, using one capacitor Cst.

Meanwhile, for convenience of illustration, the transistors M1 to M7 are implemented as PMOS transistors in the present invention. However, the present invention is not limited thereto. In other words, the transistors M1 to M7 may be implemented as NMOS transistors.

In the present invention, the organic light emitting diode OLED generates red, green or blue light, corresponding to the amount of current supplied from the first transistor M1, but the present invention is not limited thereto. For example, the organic light emitting diode OLED may generate white light, corresponding to the amount of current supplied from the first transistor M1. In this case, a color image is implemented, using a separate color filter or the like.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pixel comprising:
   an organic light emitting diode;
   a first transistor controlling the amount of current supplied from a first power source to the organic light emitting diode depending on a voltage applied to a second node;
   a second transistor coupled between a data line and a first node, and turned on when a scan signal is supplied to a first scan line;
   a third transistor coupled between the first power source and the first node, and turned on when the scan signal is supplied to a second scan line;
   a fourth transistor coupled between the first power source and the second node, and turned on when the scan signal is supplied to the second scan line; and
   a storage capacitor directly coupled between the first and second nodes, the first node being connected to the second node only through the storage capacitor.

2. The pixel of claim 1, further comprising a fifth transistor coupled between the first node and a reference power source, and turned off during a period in which the second and third transistors are turned on, the fifth transistor turned off during the other period.

3. The pixel of claim 2, further comprising:
   a sixth transistor coupled between the second node and a second electrode of the first transistor, and turned on when the scan signal is supplied to the first scan line; and
   a seventh transistor coupled between the second electrode of the first transistor and the organic light emitting diode, and simultaneously turned on/off with the fifth transistor.

4. An organic light emitting display device, comprising:
   a scan driver supplying a scan signal to scan lines, and supply an emission control signal to emission control lines;
   a data driver supplying a data signal to data lines; and
   pixels positioned at intersection portions of the scan lines and the data lines, each of the pixels positioned on an i-th horizontal line comprising:
   an organic light emitting diode;
   a first transistor controlling the amount of current supplied from a first power source to the organic light emitting diode depending on a voltage applied to a second node;
   a second transistor coupled between a data line and a first node, and turned on when a scan signal is supplied to a first scan line;
   a third transistor coupled between the first power source and the first node, and turned on when the scan signal is supplied to a second scan line;
   a fourth transistor coupled between the first power source and the second node, and turned on when the scan signal is supplied to the second scan line; and
   a storage capacitor directly coupled between the first and second nodes, the first node being connected to the second node only through the storage capacitor.

5. The organic light emitting display device of claim 4, wherein the first scan line is set as an i-th scan line, and the second scan line is set as an (i−1)-th scan line.

6. The organic light emitting display device of claim 4, wherein the data signal is set to a voltage lower than that of the first power source.

7. The organic light emitting display device of claim 4, wherein the each of the pixels further includes a fifth transistor coupled between the first node and a reference power source, and turned off when an emission control signal is supplied to a first emission control line and otherwise turned on.

8. The organic light emitting display device of claim 7, wherein the voltage of the reference power source is set to a specific voltage within a voltage range of the data signal.

9. The organic light emitting display device of claim 7, wherein the first emission control line is set as an i-th emission control line.

10. The organic light emitting display device of claim 7, wherein the scan driver supplies the emission control signal to the first emission control line, the emission control signal overlapping with the scan signal supplied to the first and second scan lines.

11. The organic light emitting display device of claim 7, wherein the each of the pixels further comprises:
- a sixth transistor coupled between the second node and a second electrode of the first transistor, and turned on when the scan signal is supplied to the first scan line; and
- a seventh transistor coupled between the second electrode of the first transistor and the organic light emitting diode, and turned off when the emission control signal is supplied to the first emission control line and otherwise turned on.

* * * * *